(12) United States Patent
Schaaf et al.

(10) Patent No.: US 11,708,861 B2
(45) Date of Patent: Jul. 25, 2023

(54) SPLINE CONNECTION (71) Applicant: VOLKSWAGEN AKTIENGESELLSCHAFT, Wolfsburg (DE)

(72) Inventors: Gregor Schaaf, Cremlingen (DE); Wolfgang Heise, Wolfsburg (DE); Georg Schäfer, Tappenbeck (DE); Paul Holzfuß, Braunschweig (DE)

(73) Assignee: Volkswagen Aktiengesellschaft

( * ) Notice: Subject to any disclaimer, the term of this patent is extended or adjusted under 35 U.S.C. 154(b) by 0 days.

(21) Appl. No.: 17/467,879

(22) Filed: Sep. 7, 2021

(65) Prior Publication Data
US 2022/0074452 A1  Mar. 10, 2022

(30) Foreign Application Priority Data
Sep. 4, 2020  (DE) ............... 10 2020 211 158.8

(51) Int. Cl.
*F16D 3/06* (2006.01)
*B21D 53/88* (2006.01)
(Continued)

(52) U.S. Cl.
CPC ............... *F16D 3/06* (2013.01); *B21D 53/88* (2013.01); *B60B 27/0026* (2013.01);
(Continued)

(58) Field of Classification Search
CPC ............... F16D 3/06; F16D 2001/103; F16D 2250/0023; B21D 53/88; B60B 27/0026;
(Continued)

(56) References Cited

U.S. PATENT DOCUMENTS 1,803,995 A * 5/1931 Chilton ............... F16D 1/0858
403/359.6
3,360,961 A   1/1968 Steiner
(Continued)

FOREIGN PATENT DOCUMENTS

DE   1425231 A1   3/1969
DE   2656946 A1   6/1978
(Continued)

OTHER PUBLICATIONS

Office Action; Japanese Patent Application No. 2021-144035; dated Mar. 1, 2023.

*Primary Examiner* — Greg Binda
(74) *Attorney, Agent, or Firm* — Barnes & Thornburg, LLP (57) ABSTRACT

A spline connection having a hub with a toothing profile on the inner circumference, an axle journal having a toothing profile on an outer circumferential portion, a shoulder for axial support and/or abutment against the hub, and a tensioning device for axially bracing the axle journal with the hub. The hub has a constant toothing profile and the axle journal has a first portion and a second portion with different toothing profiles. The first portion is arranged on the insertion side to be further away from the shoulder than the second portion and has a constant toothing profile with play with respect to the toothing profile of the hub. The second portion is arranged on the shoulder side and has a toothing profile which has reduced tooth spaces compared with the first portion and which is play-free with respect to the toothing profile of the hub.

8 Claims, 4 Drawing Sheets (51) Int. Cl.
*B60B 27/00* (2006.01)
*B60B 37/00* (2006.01)
*F16D 1/10* (2006.01)

(52) U.S. Cl.
CPC ......... *B60B 37/00* (2013.01); *B60B 2310/224* (2013.01); *F16D 2001/103* (2013.01); *F16D 2250/0023* (2013.01); *Y10T 403/7035* (2015.01)

(58) Field of Classification Search
CPC ............... B60B 37/00; B60B 2310/224; Y10T 403/7035
USPC ...................................................... 403/359.6
See application file for complete search history.

(56) References Cited

U.S. PATENT DOCUMENTS

| | | |
|---|---|---|
| 4,175,404 A | 11/1979 | Schopf |
| 5,527,126 A | 6/1996 | Digel et al. |
| 7,076,854 B2 * | 7/2006 | Harms .................... F16D 1/072 |
| 9,115,613 B2 * | 8/2015 | Deblaize ............. F01L 1/34413 |
| 2016/0369847 A1 | 12/2016 | Trombat |
| 2017/0355226 A1 | 12/2017 | Cheng et al. |

FOREIGN PATENT DOCUMENTS

| | | |
|---|---|---|
| DE | 4302726 A1 | 8/1993 |
| DE | 102005035706 A1 | 2/2007 |
| DE | 102011057012 A1 | 6/2013 |
| DE | 102016210578 A1 | 12/2016 |
| EP | 0318266 A1 | 5/1989 |
| EP | 1508710 A1 | 2/2005 |
| EP | 2189674 A1 | 5/2010 |
| EP | 2980433 A1 | 2/2016 |
| FR | 3081378 A1 | 11/2019 |
| JP | S63127725 U | 8/1988 |
| JP | 2001323920 A | 11/2001 |
| JP | 2001343023 A | 12/2001 |
| SU | 694690 A1 | 10/1979 |
| WO | 2015124126 A1 | 8/2015 |

\* cited by examiner

SPLINE CONNECTION

PRIORITY CLAIM

This patent application claims priority to German Patent Application No. 10 2020 211 158.8, filed 4 Sep. 2020, the disclosure of which is incorporated herein by reference in its entirety.

SUMMARY

Illustrative embodiments relate to a spline connection, comprising a hub having a toothing profile on the inner circumference, an axle journal having a toothing profile on an outer circumferential portion, and also a shoulder for axial abutment against the hub, and a tensioning device for axially bracing the axle journal with the hub.

BRIEF DESCRIPTION OF THE DRAWINGS

Disclosed embodiments will be explained in more detail below with reference to the drawing. In the drawings.

DETAILED DESCRIPTION

Figure 1:
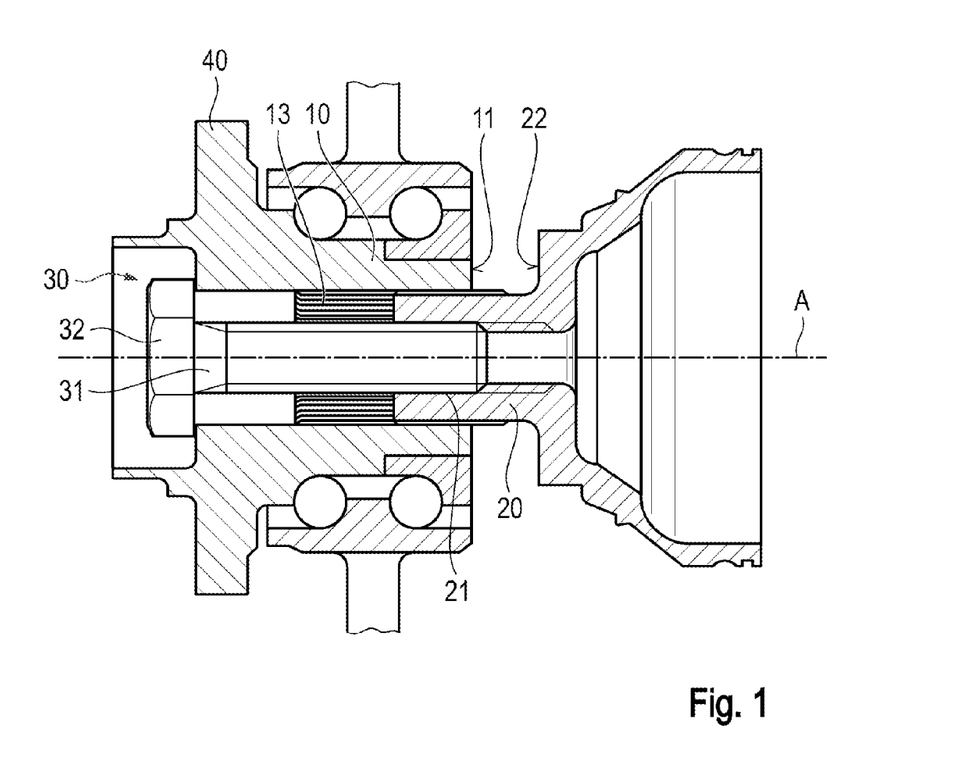
FIG. 1 shows a longitudinal sectional view through a spline connection between a drive shaft and a transportation vehicle wheel to illustrate an exemplary embodiment of a possible installation situation.

Such spline connections are usually used in transportation vehicle construction to connect, for example, a Cardan drive shaft to a driven transportation vehicle wheel. Here, the axle journal of the Cardan drive shaft is braced against the hub of a wheel bearing by a screw assembly, as is illustrated by way of example in FIG. 1. The screw assembly may in this case be provided on a short axle journal by screwing a fastening screw as tensioning device into an end side of the axle journal, as is shown in FIG. 1, or alternatively on a long axle journal with external thread onto which a nut as tensioning device is screwed. Other tensioning devices are also possible.

In all cases, the tensioning device brings about an axial support and/or abutment of the axle journal against the hub of the wheel bearing. To this end, a corresponding shoulder is formed on the axle journal. In a disclosed embodiment, the wheel bearing is preloaded by the tensioning device, wherein the shoulder of the axle journal bears directly against the bearing inner ring which is mounted on the inside of a transportation vehicle. However, there are also exemplary embodiments in which the wheel bearing is already braced by a forming of the wheel hub. In that case, the shoulder of the axle journal bears against the formed side of the wheel hub.

The transmission of torque from the Cardan drive shaft to the transportation vehicle wheel is effected, as intended, via the toothing profiles on the axle journal and on the wheel hub. Due to the described axial bracing, however, torque is also transmitted to the shoulder surface of the axle journal via friction. Undesired acoustic effects may occur at this point if the torque overcomes the static friction and produces a sudden small relative movement between the shoulder and the mating surface supporting the latter. This noise is known as a clicking sound upon launching or "ping noise".

This noise may repeatedly arise, particularly if slipping also occurs in an opposite direction, for example, when reversing or as a result of overrun torques as are produced in transportation vehicles with an electric drive in recuperation operation. As a result of the trend toward higher wheel torques (large wheels and/or large motor torques) and owing to the recuperation in transportation vehicles with an electric drive, this problem is exacerbated.

At this point, fundamentally the following solutions to the problem are offered.

Firstly, the friction at the axle journal shoulder can be increased to such a pronounced extent that slipping no longer occurs. This would, for example, be possible by way of very rough, oil-free surfaces or by way of intermediate layers of diamond fleece or diamond disks.

Secondly, the friction at the axle journal shoulder can be reduced to such an extent that noise no longer occurs during slipping. This would, for example, be possible by way of coated disks having a low coefficient of friction as intermediate layer.

Moreover, there is thirdly the possibility of designing the spline connection to be play-free, such that detachment and thus striking of the components can no longer occur. This is, for example, possible by way of adhesive bonding, which does however mean additional outlay during assembly and during servicing work, and also by way of a pressing engagement in the toothing.

The freedom from play due to compression is the desirable route to a solution from an economical standpoint, since it manages without additional substances and components.

For an economical assembly process, however, additional aids and pressing apparatuses are to be avoided. The challenge is therefore to implement a sufficient pressing engagement and to nevertheless ensure that the components are joinable "by hand".

Various solution approaches for joining such spline connections are known from the prior art.

DE 14 25 231 A describes a toothed-shaft connection for the rotationally fixed connection of an axle shaft of a transportation vehicle to a drive toothed wheel. This toothed-shaft connection points has a continually increasing tooth flank play over the axial toothing length. To this end, the tooth spaces of the toothing profile either of the shaft or hub are continually widened in a longitudinal direction of the toothing. For this purpose, the advancing direction of the tool used to produce these tooth spaces is oriented obliquely with respect to the shaft axis during the production of the shaft or of the hub. However, such a production operation is very complex in terms of manufacturing and uneconomical in terms of mass production.

DE 26 56 946 A1 describes a toothed-shaft connection in which the teeth and mating teeth mesh without play in an approximately uniform manner at least for a small portion of the toothing length of the toothed-shaft connection, while there is play in the remaining region. In this known toothed-shaft connection, the teeth and tooth spaces of the toothing profile of the hub are constant over the entire toothing length. By contrast, the teeth of the longitudinally toothed shaft are of constant thickness only in a first portion beginning on the outer end side of the hub, and subsequently narrow to an increasing extent in the direction of the other hub side. An assembly by hand is impossible here.

DE 43 02 726 C2 proposes a spline connection of the in the introduction between an axle journal and a wheel hub of a driven transportation vehicle wheel, in which spline connection the teeth and tooth spaces of the toothing profile on the axle journal are constant over the entire toothing length. By contrast, the toothing profile of the hub, from the side pointing in the opposite direction to the power flow direction, is compressed over merely a first portion of the toothing length, such that the teeth of the axle journal are pressed into the mating tooth spaces of the hub in this first portion. The compression is produced by pushing a ball into the hub, which is, however, reasonably complex. For this, an initially simple insertion of the axle journal into the hub is possible, which may take place in the context of an automated assembly without any particular centering effort, because it takes place with play. The compression in the first portion may be effected by actuation of a fastening screw, by which the axle journal is braced axially with the hub.

As already mentioned, however, in DE 43 02 726 C2 the manufacturing process for the production of the toothing profile on the hub is problematic. In addition, the play-free region of the toothing engagement is spaced apart axially from the abutment shoulder of the axle journal by a region with play. In the context of this play, a slight relative movement between the abutment shoulder of the axle journal and the hub on account of torsion of the components is furthermore possible, that is to say the problem, which is outlined in the introduction, of noise generation in the sense of a clicking sound upon launching or "ping noise" still exists here.

In practice, spline toothings having a small helix angle on the axle journal have currently become prevalent, that is to say the toothing profile here remains constant along the toothing length but winds in a helical curve (helix) about the longitudinal axis of the axle journal. This helix angle may extend over the entire toothing length. However, exemplary embodiments, particularly in the case of long axle journals, in which a straight toothing is implemented in a first portion and a toothing with a helix is implemented in a second portion or a first portion has an angular offset in relation to a second portion are also known to the applicant.

In view of the requirements of transportation vehicles with an electric drive, which often have high launching torques and large wheels and correspondingly require a high pressing engagement in the toothing to avoid the aforementioned slipping and the associated noise generation, it is becoming more difficult to implement an economical production process under the two boundary conditions of "joinable by hand" and high pressing engagement in the screwed-together state. The manufacturing tolerances for the spline toothings would have to be subjected to very extensive restrictions for this, which would result in a complex, expensive production operation.

The helix angle also leads to different properties in the force transmission depending on the torque direction, which is a drawback for the design of the interface in respect of robustness.

Against this background, the disclosed embodiments show alternatives for a press-fit connection of the generic type which, on the one hand, alleviate the problem of noise generation during load changes and, on the other hand, make it possible, taking account of an economical manufacturing operation that is suitable for mass production, to implement a high pressing engagement and to nevertheless ensure that the components are joinable by hand, that is to say without any additional pressing devices.

This is achieved by a press-fit connection which is distinguished in that the hub has a constant toothing profile over its toothing length and the axle journal has, over its toothing length, a first portion and a second portion with different toothing profiles, wherein the first portion is arranged on the insertion side, so as to be further away from the shoulder than the second portion, and has a constant toothing profile which has play with respect to the toothing profile of the hub, and the second portion is arranged on the shoulder side and has a toothing profile which has reduced tooth spaces compared with the first portion and which is play-free with respect to the toothing profile of the hub, and wherein the second portion is dimensioned in such a way that only after the first portion has been inserted with play into the hub can the second portion be compressed with the toothing profile of the hub in a play-free manner by subsequent tightening of the tensioning device.

The solution according to the disclosed embodiments makes it possible to manually introduce the axle journal into the hub, without requiring a pressing device for this purpose. As a result of axial bracing of the axle journal with the hub by the tensioning device, the second portion is brought into engagement with the toothing profile of the hub and any play in the spline connection is thereby cancelled. The generation of noise explained above is reliably prevented, particularly as the second portion is situated closer to the shoulder of the axle journal than the first portion, as a result of which no appreciable rotation of the axle journal is produced under torque. This objective is met by a small distance and a consequently high torsional stiffness between the shoulder and the location where torque is introduced into the spline toothing, that is to say in the second portion. In comparison to DE 43 02 726 C2, the manufacturing outlay is also significantly lower, since the toothing profile on the outer circumferential portion of the axle journal can be produced in a simpler manner, in particular, by rolling. Only this permits an economical manufacturing operation that is suitable for mass production.

In a first disclosed embodiment, the toothing profile of the second portion is obtained by plastic forming from a toothing profile which corresponds to the toothing profile of the first portion. This enables efficient production of an initially uniform toothing profile over the entire toothing length, for example, by profile rolling, but also by other processes, and simple subsequent machining from the outside merely of a sub-portion of this initially produced toothing profile to obtain, in the second portion, a modified profile shape for compression with the toothing profile of the hub.

In particular, the toothing profile of the second portion may be obtained by external plastic shaping from a toothing profile corresponding to the toothing profile of the first portion. The toothing profile can be accessed from the radial outer side to a significantly better extent than an inner toothing on a hub. In addition, such a stamping operation can be implemented on the same manufacturing device directly after the toothing rolling.

For a sufficiently high pressing engagement, it is advisable that the tip circle of the toothing profile of the second portion in relation to the tip circle of the toothing profile of the first portion, with respect to the diameter, is reduced by 0.1 to 1.2 times the toothing module on the first portion.

In a second disclosed embodiment, on the second portion, the spaces between the teeth of the toothing profile become continuously smaller in a longitudinal direction of the toothing. Such an embodiment can also be produced in a very efficient manner, for example, by a correspondingly contoured profile roll.

In particular, the spaces between the teeth that become smaller in the longitudinal direction of the toothing profile may be brought about by an increase in material at the tooth root and/or at the tooth flanks.

For a sufficiently high pressing engagement in the second disclosed embodiment type, it is advisable that the maximum reduction in the spaces between the teeth on the second portion lies in the range of 0.05 to 0.35 times the toothing module on the first portion.

Furthermore, it is optionally possible in all disclosed embodiment types for a helix angle, which may lie in the range of 4 to 20 arc minutes, to be superimposed on the toothing profile in the longitudinal direction of the toothing on the hub and/or on the first and/or second portion of the axle journal.

The objective is furthermore achieved by a method for toothing an axle journal having a toothing profile on an outer circumferential portion, wherein the axle journal has, over its toothing length, a first portion and a second portion with different toothing profiles, and the method being distinguished in that initially a toothing profile which corresponds to the toothing profile of the first portion is provided on the outer circumferential portion over its entire toothing length, namely the region of the first portion and of the second portion, by profile rolling, and, in a further operation, the teeth in the region of the second portion are pushed radially inwards such that the tip circle diameter is tapered.

This allows an economical manufacturing operation that is suitable for mass production.

Optionally, the inward pushing is effected by a roller which is displaced in a relative manner axially along the toothing length over the second portion. Such a roller may be arranged spatially next to a profile roll of a manufacturing device for production of the toothing profile, such that both processes, rolling and inward pushing or embossing, can be performed in direct succession.

The aforementioned objective is furthermore achieved by a method for toothing an axle journal having a toothing profile on an outer circumferential portion, wherein the axle journal has, over its toothing length, a first portion and a second portion with different toothing profiles, and the method being distinguished in that the toothing profile of the first and second portions is produced at the same time by a roll or a rolling beam by profile rolling or alternatively by axial forming. The roll or the rolling beam has a negative toothing profile which, in the region for the second portion, proceeding from the region for the first portion, is cut in a deepening manner. In the case of the axial forming, the corresponding die has a negative toothing profile which, in the region for the second portion, proceeding from the region for the first portion, is cut in a deepening manner.

This also allows a particularly economical manufacturing operation that is suitable for mass production, wherein it should additionally be emphasized that the shaping of the toothing profile on the axle journal is effected in a single manufacturing operation in this exemplary embodiment.

All the toothing profiles are hardened after shaping.

FIG. 1 shows by way of example the installation situation of a disclosed spline connection. Visible are a wheel bearing 1 of a transportation vehicle wheel with a hub 10 and a joint outer part 2 of a constant-velocity joint of a side shaft with an axle journal 20.

The axle journal 20 is introduced axially into the hub 10 and braced axially against the hub 10 by a tensioning direction 30. In the present case, the tensioning device 30 illustrated is, for example, a fastening screw 31, which is supported by way of a head 32 against a wheel flange 40 and via the latter against the hub 10 of the wheel bearing. The fastening screw 30 is screwed on the end side into a corresponding threaded opening 21 of the axle journal 20.

In a modification of the exemplary embodiment, the end side of the axle journal 20 may be provided with a threaded portion onto which a fastening nut as tensioning device 30 is screwed, the fastening nut being supported for its part against the hub 10.

FIG. 1 shows the wheel bearing and the side shaft in a not yet finally assembled state, which in the present case is obtained only by further axial pushing together of the wheel bearing and the side shaft and subsequent axial bracing by the tensioning device 30. In the finally assembled state, a shoulder 22 of the axle journal 20 is supported against an external end side 11 of the hub 10. In this contact region, a slight relative movement can result in clicking noises, which the present disclosure is seeking to avoid. For this purpose, the spline connection composed of hub 10 and axle journal 20 is embodied as described in more detail below.

The disclosed spline connection is based on a toothing engagement between a toothing profile 13 on the inner circumference of the hub 10 with a toothing profile 23 on an outer circumferential portion 24 of the axle journal 20.

The outer circumferential portion 24, which is provided with the toothing profile 23, of the axle journal 20 is spaced apart from the shoulder 22 by a relief groove 25 and extends as far as the end face 26 of the axle journal 20.

The toothing profile 13 of the hub 10 is constant over its entire toothing length, that is to say teeth and spaces always have the same dimensions in an axial direction of the hub 10.

Figure 2:
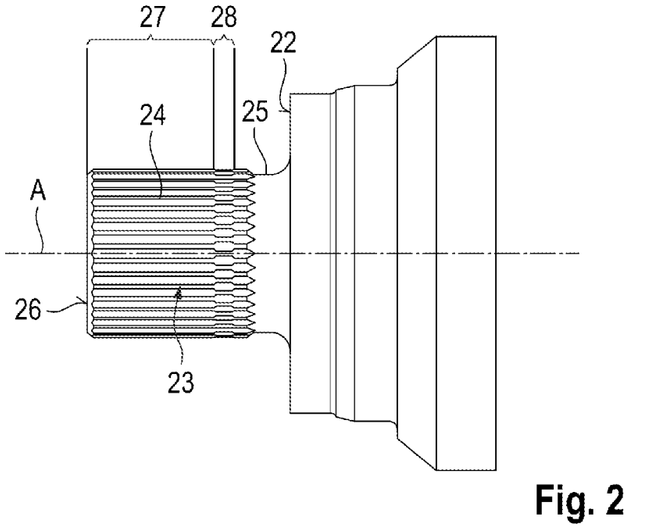
FIG. 2 shows a first exemplary embodiment of a disclosed axle journal.

By contrast, the axle journal 20 has, over its toothing length, at least a first portion 27 and a second portion 28 with different toothing profiles.

By definition, in the present case, the first portion 27 is arranged on the insertion side, that is to say further away from the shoulder 22 than the second portion 28. In the present case, the second portion 28 is understood to be that portion which is closer to the shoulder 22.

As FIG. 2 shows, the first portion 27 has a greater axial length than the second portion 28. In this case, the axial length of the first portion 27 may be dimensioned such that the tensioning device 30 can be screwed in by at least 2.5 thread revolutions, optionally by at least 3 thread revolutions, before the toothing profile 13 of the hub 10 comes into engagement with the second portion 28.

The first portion 27 has a toothing profile 23a that is constant in the longitudinal direction A of the toothing length and that has play with respect to the toothing profile 13 of the hub 10.

By contrast, the second portion 28, which is arranged on the shoulder side, has a toothing profile 23b which has reduced tooth spaces compared with the first portion 27 and which is play-free with respect to the toothing profile 13 of the hub 10.

In this way, during assembly, the axle journal 20 can be easily inserted into the hub 10 by hand, specifically over the region of engagement of the first portion 27 with the toothing profile 13 of the hub 10. The tensioning device 30 is subsequently actuated. The tensioning device can be screwed by at least 2.5 thread revolutions in the state of engagement with play. In the exemplary embodiment illustrated, this means that the fastening screw 31 engages over at least 2.5 thread revolutions with the internal thread of the threaded opening 21 of the axle journal 20. In this way, a sufficient pull-out force for the subsequent "drawing in" of the axle journal 20 into the hub 10 is ensured, in which "drawing in" the toothing profile 23b of the second portion 28 is compressed with the toothing profile 13 of the hub 10 by rotation of the fastening screw 31 or of the tensioning device 30. During this tensioning, the shoulder 22 ultimately comes into abutment against the hub 10, with the result that the wheel bearing is also axially fixed at the same time.

The second portion 28 having the associated toothing profile 23b is thus arranged in such a way that only after the first portion 27 has been inserted with play into the hub 10 can the second portion be compressed with the toothing profile 13 of the hub 10 in a play-free manner by subsequent tightening of the tensioning device 30.

In a first exemplary embodiment, the play-free toothing profile 23b of the second portion 28 is obtained by plastic forming from a toothing profile which is identical to the toothing profile 23a of the first portion 27. It is thus possible for the outer circumferential portion 24 to initially be provided continuously with the toothing profile 23a of the first portion 27. The toothing profile 23b of the second portion 28 is produced by subsequent machining of this first toothing profile 23a in the region of the second portion 28.

Figure 3:
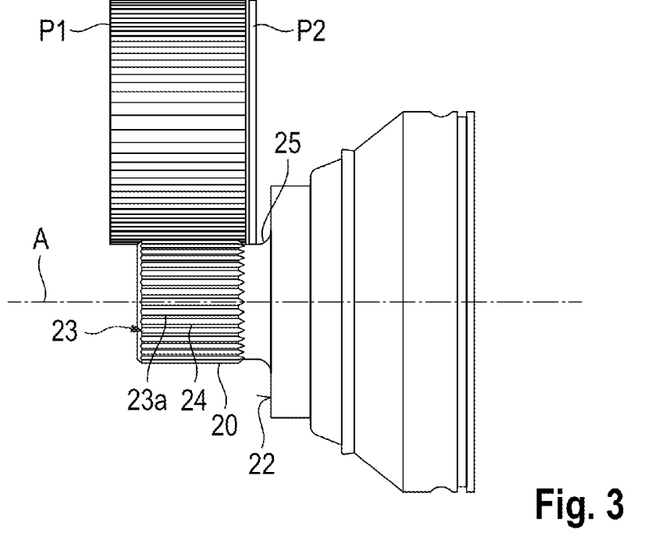
FIG. 3 shows an illustration of the production of the axle journal of FIG. 2.

The toothing profile 23a of the first portion 27 can be produced fundamentally in any desired manner. Optionally, however, this is effected by profile rolling by a profile roll P1, as is indicated in FIG. 3. The circumference of the profile roll P1 is provided with a negative profile of the toothing profile 23a of the first portion 27.

The second portion 28, which is modified in terms of the toothing profile 23b, is obtained by external plastic shaping from the first toothing profile 23a. This may be effected, for example, and without being limited thereto, by a non-toothed roller P2.

The non-toothed roller P2 may be arranged next to the profile roll P1 in a corresponding manufacturing device. Optionally, at the beginning of the toothing production, the non-toothed roller is in the relief groove 25 of the axle journal 20 close to the shoulder 22. The non-toothed roller is subsequently pushed by a small axial movement of, for example, approximately 5 mm over the toothing produced by the profile roll P1 and deforms the tooth tips of the toothing profile 23b in the region of the second portion 28.

The roller P2 may be embodied as a relatively thin disk, to minimize the torsional length of the axle journal 20 between the shoulder 22 and the play-free toothing engagement on the second portion 28. If appropriate, two or more rollers P2 may be provided. The rollers may be arranged in such a way that their pressure forces compensate each other.

The tip circle of the toothing profile 23b of the second portion 28 in relation to the tip circle of the toothing profile 23a of the first portion 27, with respect to the diameter, may be reduced by 0.1 to 1.2 times the toothing module of the toothing on the first portion 27.

In the case of a toothing profile 23a having, for example, 38 teeth, a tip circle having a diameter of, for example, 30.9 mm is reduced in the second portion 28 to a tip circle diameter of 30.5 mm. The axial length of the second portion 28 can be selected to be relatively short at about 2 to 5 mm, such that the subsequent machining effort by inward forming or embossing remains low. The non-toothed disk P2 remains relatively narrow here and can therefore be readily accommodated in the relief groove 25.

The inward forming or embossing may be effected directly at the shoulder-side start of the toothing length of the axle journal 20.

Figure 4:
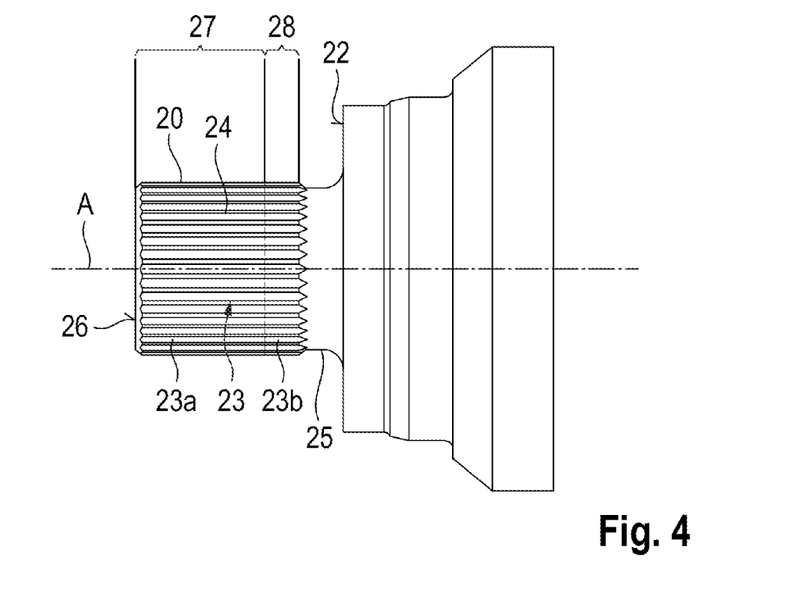
FIG. 4 shows a second exemplary embodiment of a disclosed axle journal.

In a second exemplary embodiment, the axle journal 20 is modified in relation to the first exemplary embodiment. All of the further component parts may furthermore be embodied as explained above.

The axle journal 20 of the second exemplary embodiment has, again over its toothing length, a first portion 27 and a second portion 28 with different toothing profiles, wherein the first portion 27 is arranged on the insertion side, so as to be further away from the shoulder 22 than the second portion 28, and has a constant toothing profile 23a with play with respect to the toothing profile 13 of the hub 10. The second portion 28 is closer to the shoulder 22 than the first portion 27 and has a toothing profile 23b which has reduced tooth spaces compared with the first portion 27 and which is play-free in a circumferential direction with respect to the toothing profile 13 of the hub 10, as in the case of the first exemplary embodiment. The second portion 28 is arranged in such a way that only after the first portion 27 has been inserted with play into the hub 10 and corresponding engagement with the toothing profile 13 is the second portion compressed with the toothing profile 13 of the hub 10 in a play-free manner by subsequent tightening of the tensioning device 30. Express reference should again be made at this point to the relevant statements relating to the first exemplary embodiment.

In the second exemplary embodiment, the compression of the second portion 28 with the toothing profile 13 of the hub 10 is brought about during the axial bracing in that, on the second portion 28, the spaces between the teeth of the toothing profile 23b become continuously smaller in the longitudinal direction A of the toothing, that is to say taper conically or with another profile to a certain extent in the longitudinal direction A. A possible shaping of the tapering is illustrated by way of example in an enlarged form and not to scale in FIG. 5 for the purpose of illustration. In practice, this tapering is in the order of magnitude of a few hundredths to a few tenths of a millimeter.

Figure 5:
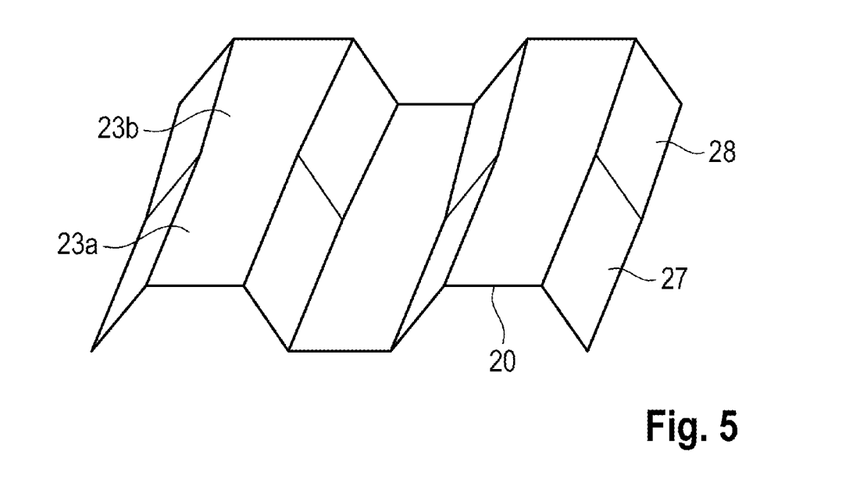
FIG. 5 shows a detail view of the toothing geometry of the second portion on the axle journal according to a second exemplary embodiment.

The spaces between the teeth that become smaller in the longitudinal direction of the toothing profile 23b can be implemented by an increase in material at the tooth root and/or at the tooth flanks in the region of the second portion 28.

The maximum reduction in the spaces between the teeth on the second portion 28 may be selected in a range of 0.05 to 0.35 times the toothing module of the toothing on the first portion 27.

The toothing profile 23 on the axle journal 20, that is to say both on the first portion 27 and on the second portion 28, can be produced at the same time by profile rolling using a single profile roll, which is correspondingly contoured for this purpose. A subsequent machining operation as in the case of the first exemplary embodiment can be omitted as a result.

For this purpose, the profile roll has a negative toothing profile for the different toothing profiles 23a and 23b of the first and second portions 28. This negative toothing profile, in the region for the second portion, proceeding from the region for the first portion, is cut in a deepening manner. In this way, the tooth space on the negative toothing profile becomes wider, and conversely becomes correspondingly smaller on the toothing profile 23b of the axle journal 20.

In the case of a constant pre-turning diameter on the axle journal, a somewhat reduced tip circle diameter is produced in the second portion 28, since the material in the wider tooth remains.

The axial length of the second portion 28 can, in the case of dimensions as indicated for the first exemplary embodiment, be selected at approximately 6 to 12 mm, that is to say here is less than half, possibly even less than a quarter, of the toothing length on the outer circumferential portion 24 of the axle journal 20.

Numerous modifications can be made to the embodiment explained above.

For instance, in cross section, the teeth of the toothing profiles may be produced, for example, as a prism, as a trapezoid as illustrated in FIG. 5 or else with another cross-sectional shape.

Figure 6:
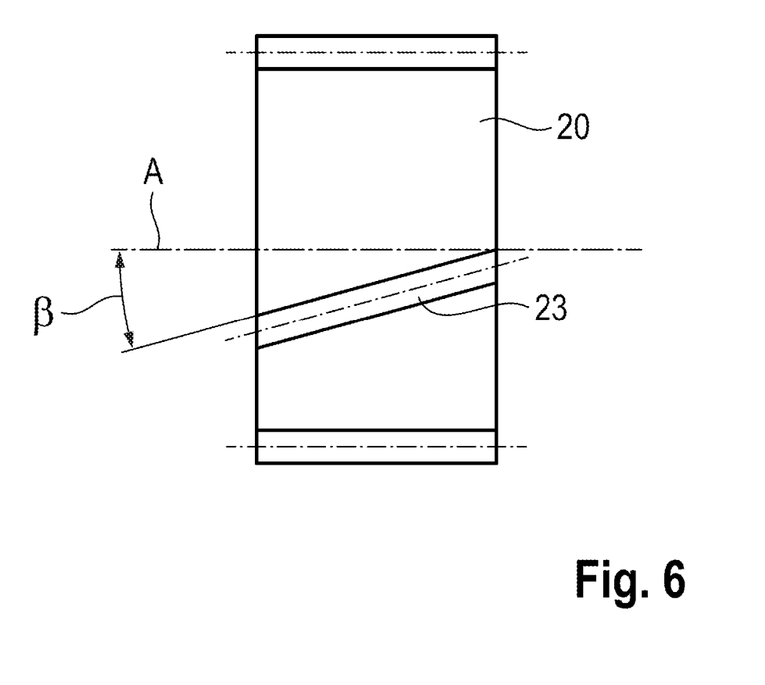
FIG. 6 shows a schematic diagram of a helix angle of a toothing.

It is furthermore possible for individual portions of the toothing to additionally be superimposed with a helix angle (β, as is indicated in FIG. 6. The helix angle is very small and is illustrated in a disproportionate form in FIG. 6. It may lie in a range of 4 to 20 arc minutes.

The superimposition can be applied to the toothing profile in the longitudinal direction of the toothing on the hub 13. The toothing profile 13 remains constant here, but is rotated to some extent about the longitudinal direction A with progressing axial length.

Equally, a helix angle β may also be provided on the first portion 27 and/or second portion 28 of the axle journal 20, to obtain more pronounced compression.

The profiling of the toothing of the axle journal 20 may alternatively also be effected by a rolling beam. A rolling beam is a straight rod which forms, on a working surface, a negative contour for the production of the toothing. During the profile rolling, the workpiece rolls with its circumference on the correspondingly profiled working surface of the rolling beam, and therefore the profiling of the rolling beam is replicated on the circumference of the workpiece on account of the pressure applied between the workpiece and the tool. A change in profile as described above may be correspondingly implemented in the rolling beam.

Furthermore, the spline toothing having partially tapered tooth spaces on the axle journal 20 can also be applied by the axial forming manufacturing method. During the axial forming, the forming tool, a die, is driven axially against the clamped-in axle journal 20. The negative shape of the spline toothing to be produced is incorporated on the inner circumference of the die.

A conical tapering of the toothing, for example, as has been described above in conjunction with the second exemplary embodiment according to FIGS. 4 and 5, is accommodated by this forming method. The die may be cut to a deeper extent in the profile region provided for the second portion 28 than in the upstream profile region. Since this deeper cut profile region is advanced up to close to the shoulder 22, tooth spaces whose width becomes smaller in turn are produced on the axle journal 20 close to the shoulder, while larger tooth spaces are obtained in the first portion 27 remote from the shoulder. It is not a problem in this case that, during the displacement of the die in the axial direction A of the axle journal 20, the deeper cut region is moved first over the first portion 27, since the final shaping thereof is determined by the subsequent less deeply cut profile region of the die. The correspondingly narrower teeth on the deeper cut profile region of the die can be moved back over the finally formed first portion 27 again without any problems after forming the second portion 28.

The disclosure has been explained in more detail above on the basis of various exemplary embodiments. These serve to demonstrate the practicability of the disclosure. Individual technical features which have been explained above in the context of further individual features can also be implemented independently thereof and in combination with further individual features even if this is not expressly described as long as this is technically possible. The disclosure is, therefore, expressly not limited to the exemplary embodiments and modifications specifically described but includes all the embodiments defined by the patent claims.

LIST OF REFERENCE SIGNS

1 Wheel bearing
2 Joint outer part
10 Hub
11 End side of the hub 10
13 Toothing profile of the hub 10
20 Axle journal
21 Threaded opening
22 Shoulder
23 Toothing profile
23a Toothing profile of the first portion 27
23b Toothing profile of the first portion 28
24 Outer circumferential portion of the axle journal 20
25 Relief groove
26 End face of the axle journal 20
27 First portion
28 Second portion
30 Tensioning direction
31 Fastening screw
32 Head
40 Wheel flange
A Longitudinal direction of the toothing length=axial direction of the axle journal 20
P1 Profile roll
P2 Non-toothed roller (disk)

The invention claimed is:

1. A spline connection comprising:
a hub including a toothing profile on an inner circumference, wherein the hub toothing profile is constant over its toothing length;
an axle journal including a toothing profile on an outer circumferential portion and a shoulder for axial support and/or abutment against the hub; and
a tensioning device for axially bracing the axle journal with the hub,
wherein the axle journal comprises a first portion and a second portion with different toothing profiles over the axle journal's toothing length,
wherein the first portion of the axle journal is arranged on an insertion side to be further away from the shoulder than the second portion of the axle journal, wherein the first portion of the axle journal has a constant toothing profile which has play with respect to the toothing profile of the hub, and the second portion of the axle journal is arranged on a shoulder side and has a toothing profile which has reduced tooth spaces compared with the first portion of the axle journal and which is play-free with respect to the toothing profile of the hub, and
wherein the second portion of the axle journal is arranged such that only after the first portion of the axle journal has been inserted with play into the hub, the second portion is compressed with the toothing profile of the hub such that play is prohibited as a result of subsequent tightening of the tensioning device.

2. The spline connection of claim 1, wherein the toothing profile of the axle journal second portion is formed by plastic forming from a toothing profile corresponding to the toothing profile of the axle journal first portion.

3. The spline connection of claim 1, wherein the toothing profile of the axle journal second portion is formed by external plastic shaping from a toothing profile corresponding to the toothing profile of the axle journal first portion.

4. The spline connection of claim 1, wherein a tip circle of the toothing profile of the axle journal second portion in relation to a tip circle of the toothing profile of the axle journal first portion, with respect to the diameter, is reduced by 0.1 to 1.2 times a toothing module on the axle journal first portion.

5. The spline connection of claim 1, wherein, on the axle journal second portion, the spaces between the teeth of the toothing profile become continuously smaller in a longitudinal direction of the toothing.

6. The spline connection of claim 5, wherein the spaces between the teeth that become smaller in the longitudinal direction of the toothing profile are brought about by an increase in material at the tooth root and/or at the tooth flanks.

7. The spline connection of claim 5, wherein the maximum reduction in the spaces between the teeth on the axle journal second portion lies in the range of 0.05 to 0.35 times a toothing module on the axle journal first portion.

8. The spline connection of claim 1, wherein the toothing profile in the longitudinal direction of the toothing on the hub and/or on the first and/or second portion of the axle journal has a helix angle $\beta$ in the range of 4 to 20 arc minutes.

* * * * *